United States Patent
Azaria et al.

(10) Patent No.: US 11,405,412 B2
(45) Date of Patent: Aug. 2, 2022

(54) INLINE ANOMALY DETECTION FOR MULTI-REQUEST OPERATIONS

(71) Applicant: Imperva, Inc., Redwood City, CA (US)

(72) Inventors: Jonathan R. Azaria, Beit Gamliel (IL); Ori Or-Meir, Tel Aviv (IL); Nadav Avital, Padres Hana Karkur (IL); Amir Shladovsky, Ramat Gan (IL); Ben Herzberg, Modiin (IL)

(73) Assignee: Imperva, Inc., San Mateo, CA (US)

( * ) Notice: Subject to any disclaimer, the term of this patent is extended or adjusted under 35 U.S.C. 154(b) by 232 days.

(21) Appl. No.: 16/730,752

(22) Filed: Dec. 30, 2019

(65) Prior Publication Data
US 2021/0203674 A1 Jul. 1, 2021

(51) Int. Cl.
*H04L 29/06* (2006.01)
*H04L 9/40* (2022.01)

(52) U.S. Cl.
CPC ...... *H04L 63/1416* (2013.01); *H04L 63/0281* (2013.01); *H04L 63/1425* (2013.01); *H04L 63/20* (2013.01)

(58) Field of Classification Search
CPC ............. H04L 63/0281; H04L 63/1416; H04L 63/1425; H04L 63/20
See application file for complete search history.

(56) References Cited

U.S. PATENT DOCUMENTS

| | | | | |
|---|---|---|---|---|
| 10,412,106 | B2* | 9/2019 | Srivastava | H04L 63/1466 |
| 2010/0299292 | A1* | 11/2010 | Collazo | G06F 21/577 |
| | | | | 706/14 |
| 2017/0126709 | A1* | 5/2017 | Baradaran | H04L 63/1416 |
| 2017/0149810 | A1* | 5/2017 | Keshet | H04L 63/145 |
| 2018/0191520 | A1* | 7/2018 | He | H04M 7/0024 |
| 2018/0198812 | A1* | 7/2018 | Christodorescu | H04L 63/1425 |
| 2018/0262521 | A1* | 9/2018 | Wang | H04L 63/1466 |
| 2018/0288063 | A1* | 10/2018 | Koottayi | H04L 63/102 |

\* cited by examiner

*Primary Examiner* — Joseph P Hirl
*Assistant Examiner* — Ka Shan Choy
(74) *Attorney, Agent, or Firm* — Nicholson, De Vos, Webster & Elliott, LLP (57) ABSTRACT

A method is described for a proxy to mitigate attacks from web application clients based on context of web application layer requests. The method includes receiving a plurality of web application layer requests from a web application layer client; aggregating a first set of requests from the plurality of web application layer requests, wherein the first set of requests are part of a first session; determining a profile based on the first set of requests, wherein the profile describes a baseline of expected behavior for a user of the web application layer client; and determining a first threat value associated with the first set of requests based on the first set of requests and the profile, wherein the first threat value describes the likelihood that the first set of requests are part of an attack on one or more web application servers.

17 Claims, 5 Drawing Sheets

INLINE ANOMALY DETECTION FOR MULTI-REQUEST OPERATIONS

TECHNICAL FIELD

Embodiments of the invention relate to the field of computer networks, and more specifically, to inline anomaly detection for multi-request operations.

BACKGROUND

A web application server is system software (e.g., running on top of an operating system) executed by server hardware upon which web applications run. Web application servers may include a web server (e.g. Apache, Microsoft® Internet Information Server (IIS), nginx, lighttpd), which delivers web pages on the request of web application clients (e.g., HyperText Transfer Protocol (HTTP) clients using HTTP), and may also include an application server that executes procedures (i.e., programs, routines, scripts) of a web application. Web applications are computer software applications made up of one or more files including computer code that run on top of web application servers and are written in a language the web application server supports. Web applications are typically designed to interact with web application clients by dynamically generating web application layer responses (e.g., HTTP response messages) responsive to web application layer request messages (e.g., HTTP request messages) sent by those web application clients.

Web application clients interact with web applications by sending web application layer requests to web application servers, which execute portions of web applications and return web application data/content (e.g., HyperText Markup Language (HTML) page) in the form of web application layer responses (e.g., HTTP response messages) back to the web application clients, where the web application data/content may be rendered by the web application clients (e.g., using the rendering engine of a web browser). Thus, web applications may be provided using a request-response protocol (e.g., HTTP) in a client-server computing model, where the web application servers typically act as the "server" and the web application clients typically act as the "client."

By way of an operational example, a web application client may request a web page from a web application server by sending it an HTTP request message. For example, to access the web page corresponding to the Uniform Resource Locator (URL) of "http://www.example.org/index.html", the web browser may connect to the web application server at www.example.org by sending it an HTTP request message using a "GET" method, which may look like the following:
GET/index.html HTTP/1.1
Host: www.example.org The web application server may reply by sending a set of HTTP headers along with the requested web page, which collectively is called an HTTP response message.

A web application layer proxy may be deployed between web application clients and web application servers to provide various functions such as content caching, traffic scrubbing, Internet Protocol (IP) address masking, load balancing, and security analysis. The web application layer proxy may establish connections with the web application clients and receive web application layer requests (e.g., HTTP request messages) intended for the web application servers from the web application clients over those connections. The web application layer proxy may also establish connections with the web application servers and send the web application layer requests received from the web application clients to the web application servers (e.g., if it determines that the web application layer requests do not pose a security threat).

A web application layer proxy may apply different security models to traffic being sent between web application clients and web application servers. This may include applying (1) negative security models and (2) schema enforcement security models. In a negative security model, the web application layer proxy maintains a list of impermissible/prohibited actions/requests and compares each individual web application layer request to detect impermissible/prohibited actions/requests (i.e., based on a match with an impermissible request). While negative security models are effective against known attacks, they usually do not protect against zero-day attacks and business logic attacks, the latter of which are only evident through the context of actions. Conversely, in a schema enforcement security model, the web application layer proxy maintains a list of permissible actions/requests and compares each individual web application layer request to detect impermissible/prohibited actions/requests (i.e., based on a failure to match with a permissible request). While schema enforcement security models can be effective against several types of attacks, these models are not effective against attacks that are only evident through the context of actions (e.g., business logic attacks).

BRIEF DESCRIPTION OF THE DRAWINGS

The invention may best be understood by referring to the following description and accompanying drawings that are used to illustrate embodiments of the invention. In the drawings.

DETAILED DESCRIPTION

In the following description, numerous specific details such as logic implementations, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

Bracketed text and blocks with dashed borders (e.g., large dashes, small dashes, dot-dash, and dots) are used herein to illustrate optional operations that add additional features to embodiments of the invention. However, such notation should not be taken to mean that these are the only options or optional operations, and/or that blocks with solid borders are not optional in certain embodiments of the invention.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. Further, although a "Uniform Resource Locator" (URL) is one type of "Uniform Resource Identifier" (URI), these terms are used interchangeably herein to refer to a URI, which is a string of characters used to identify a name or a web resource.

As used herein, a network device (e.g., a router, switch, bridge) is an electronic device that is a piece of networking equipment, including hardware and software, which communicatively interconnects other equipment on the network (e.g., other network devices, end stations). Some network devices are "multiple services network devices" that provide support for multiple networking functions (e.g., routing, bridging, and/or switching), and/or provide support for multiple application services (e.g., data, voice, and video). Client end stations (e.g., server hardware, workstations, laptops, netbooks, palm tops, mobile phones, smartphones, multimedia phones, Voice Over Internet Protocol (VOIP) phones, user equipment (UE), terminals, portable media players, GPS units, gaming systems, set-top boxes) may execute an HTTP client (e.g., a web browser) to access content and/or services provided over a LAN, over the Internet, and/or over virtual private networks (VPNs) overlaid on (e.g., tunneled through) the Internet. The content and/or services are typically provided by one or more end stations (e.g., server end stations comprising server hardware) running a web application server and belonging to a service or content provider or end stations participating in a peer to peer service, and may include, for example, public web pages (e.g., free content, store fronts, search services), private web pages (e.g., username/password accessed web pages providing email services), and/or corporate networks over VPNs.

As mentioned above, web application clients interact with web applications by sending web application layer requests to web application servers, which run the web applications. A web application layer proxy may collect the web application layer requests prior to transmitting/forwarding to a corresponding web application server such that the web application server can fulfill the web application layer requests (i.e., construct and return web application layer responses). In particular, the web application layer proxy may construct sequences of web application layer requests according to corresponding sessions and use the sequences of web application layer requests to construct profiles, which describe behavior of clients during interactions with web application servers. In particular, the profiles describe a baseline or expected behavior to expect from clients based on past behavior of the clients (e.g., a baseline is determined based on past sequences of requests). These profiles may be constructed per client, device, etc. In some embodiments, the profiles may describe discrete flows in the sequences of requests. Further, the web application layer proxy may determine a context tag associated with web application layer requests within each flow. For example, the web application layer proxy may determine that a first set of web application layer requests are associated with a client logging into a web application hosted on a web application server, while a second sequence of web application layer requests are associated with a client purchasing a product via the web application hosted on the web application server. In addition to context tagging flows, using the dynamically generated and updated profiles, the web application layer proxy can determine a risk level/rank associated with sequences of web application layer requests (i.e., a rank value that indicates a likelihood that a sequence of web application layer requests is part of an attack). Based on a configuration, which includes rules that map actions to one or more of (1) details of a sequence of web application layer requests, (2) a context associated with flows, and (3) a rank/threat value associated with a current sequence of web application layer requests, the web application layer proxy may determine and carryout an action associated with the current sequence of web application layer requests to mitigate a potential attack. Further details regarding this technique will be provided by way of example.

Figure 1:
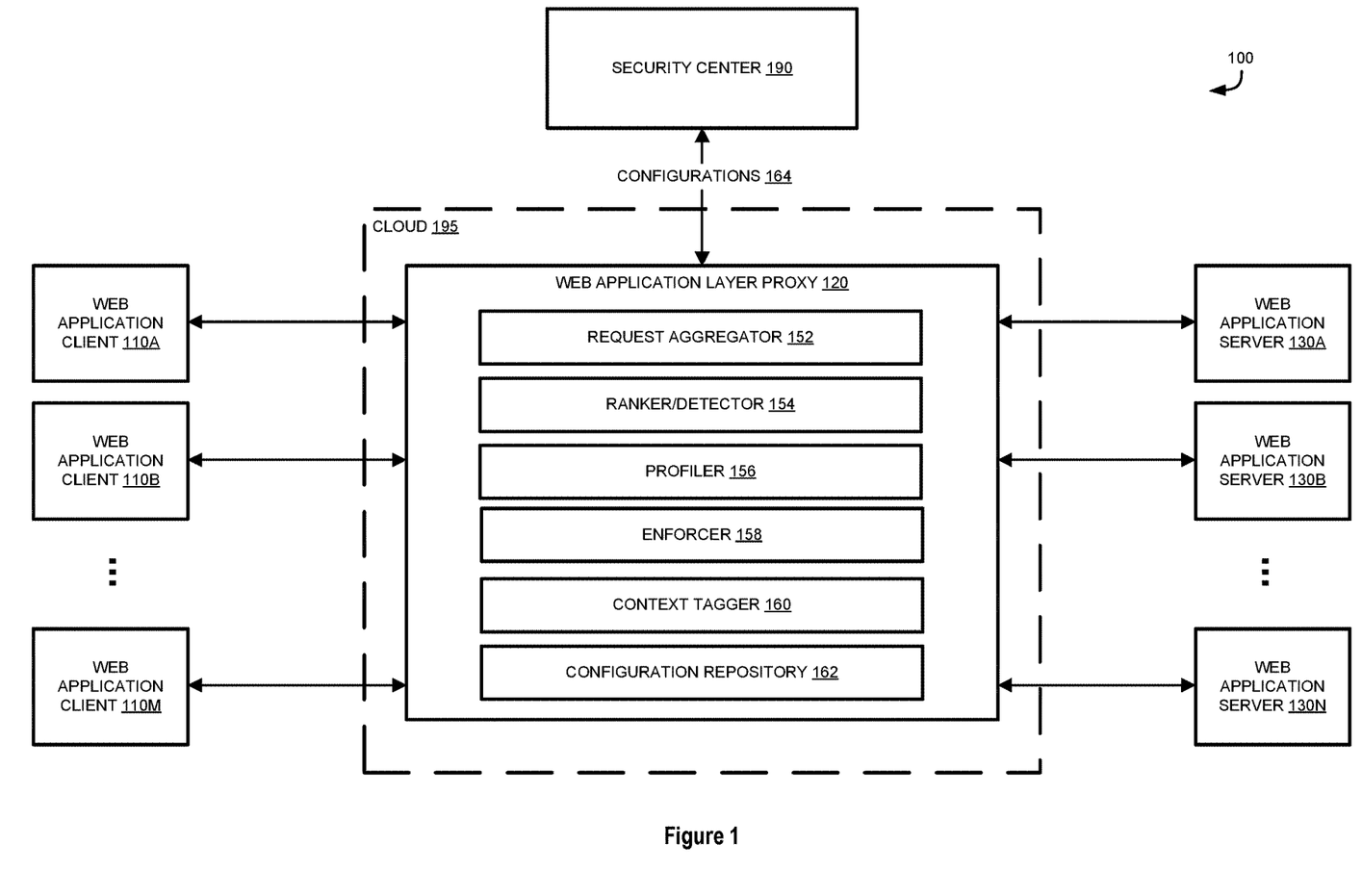
FIG. 1 is a block diagram illustrating a system for dynamically detecting attacks based on sequences of web application layer requests, according to one example embodiment.

FIG. 1 is a block diagram illustrating a system 100 for dynamically detecting attacks based on sequences of web application layer requests, according to some embodiments. As illustrated in FIG. 1, the system 100 includes web application clients 110A-110M, web application servers 130A-130N, a web application layer proxy 120 communicatively coupled between the web application clients 110A-110M and the web application servers 130A-130N, and a security center 190 communicatively coupled to the web application layer proxy 120. Each of these components will be described by way of example below. In some embodiments, the system 100 may include additional or alternative components than those shown in the block diagram of FIG. 1.

As used herein, a web application client 110 is an application that can access the content and/or services provided by a web application server 130 (e.g., HyperText Transfer Protocol (HTTP) clients such as web browsers). As used herein, a web application server 130 is an application that provides content or services (e.g., provides web pages or other type of content/services) upon a request (e.g., a web application layer request) of web application clients 110. Each of the web application clients 110 and the web application servers 130 may be implemented by one or more electronic/network devices.

Each of the web application clients 110 may be operated by a client (sometimes referred to a as a consumer) and may generate one or more web application layer requests (e.g., Hypertext Transfer Protocol (HTTP) request messages such as a "POST" HTTP request messages or "GET" HTTP request messages) and send/address these web application layer requests to the web application servers 130. In response to receiving web application layer requests, the web application servers 130 may send corresponding web application layer responses (e.g., HTTP response messages) to the web application clients 110. The web application clients 110 may then render the contents of the web application layer responses (e.g., on a display screen for an end user (e.g., a client or consumer)) or otherwise utilize the contents of the web application layer responses.

The web application layer proxy 120 acts as an intermediary between the web application clients 110 and the web application servers 130 and may provide various functions depending on the implementation of the web application layer proxy 120. For example, the web application layer proxy 120 may be configured to provide content caching, traffic scrubbing, Internet Protocol (IP) address masking, load balancing, security analysis, or any combination thereof.

The web application layer proxy 120 may establish connections with the web application clients 110 and receive web application layer requests (e.g., HTTP request messages) intended for the web application servers 130 from the web application clients 110 over those connections. The web application layer proxy 120 may also establish connections with the web application servers 130 and send web application layer requests received from the web application clients 110 to the web application servers 130 over those connections. Thus, the web application layer proxy 120 may sit inline to the traffic being sent between the web application clients 110 and the web application servers 130 such that the web application layer proxy 120 can see the traffic being sent between the web application clients 110 and the web application servers 130. In one embodiment, the web application layer proxy 120 is a web application firewall that protects the web application servers 130 against web application layer attacks from the web application clients 110. In such an embodiment, the web application layer proxy 120 may protect the web application server 130 against a variety of attacks including, but not limited to, Structured Query Language injection (SQLi) attacks, Cross-Site Request Forgery (CSRF) attacks, Remote File Inclusion (RFI) Attacks (e.g., based on applying security rules), and business logic attacks, which require understanding of the context of actions. In addition to the above types of attacks, the web application layer proxy 120 can be configured, as will be described in greater detail below, to identify and take action in response to zero-day attacks (i.e., attacks from the web application clients 110 that were not identified prior to the current detection). The web application layer proxy 120 may be implemented by one or more electronic/network devices.

While FIG. 1 shows that the system 100 includes a single web application layer proxy 120, in some embodiments the system 100 may include multiple web application layer proxies 120 (e.g., that are geographically dispersed), which are communicatively coupled between the web application clients 110 and the web application servers 130. Also, while FIG. 1 shows an inline deployment (i.e., the web application layer proxy 120 is sitting inline in relation to the traffic between the web application clients 110 and the web application servers 130), it should be understood that the context aware attack detection mechanisms described herein can also be implemented in non-inline deployments (e.g., a system that includes a security device that sniffs traffic being sent between the web application clients 110 and the web application servers 130).

The security center 190 represents a device or entity that is responsible for managing the security policies/configurations for the web application layer proxy 120. For example, as will be described in greater detail below, the security center 190 may configure the web application layer proxy 120 with a set of configurations 164 that specify the parameters based upon which the web application layer proxy 120 is to apply security rules to traffic upon the detection of an attack. For example, the configurations 164 may include a mapping of a set of characteristics (e.g., threat rankings, characteristics of sequences of web application layer requests, and information describing the context of sequences of web application layer requests) to corresponding actions to be taken by the web application layer proxy 120 to mitigate attacks against the web application servers 130. The security center 190 may also receive various traffic statistics and alerts generated by the web application layer proxy 120 and analyze these statistics and/or alerts for developing and/or updating the configurations 164. In some embodiments, the configurations may be developed and/or updated by an administrator of the system 100.

As shown in FIG. 1, the web application layer proxy 120 includes a request aggregator 152, a ranker/detector 154, a profiler 156, an enforcer 158, a context tagger 160, and a configuration repository 162. As will be described in greater detail below, these components of the web application layer proxy 120 can work together to detect attacks on the web applications servers 130 from the web application clients 110 by determining several pieces of information, including the context of sequences of web application layer requests received from the web application clients 110. For example, FIG. 2 shows a configuration of components of the web application layer proxy 120 for detecting and mitigating attacks, according to one example embodiment.

Figure 2:
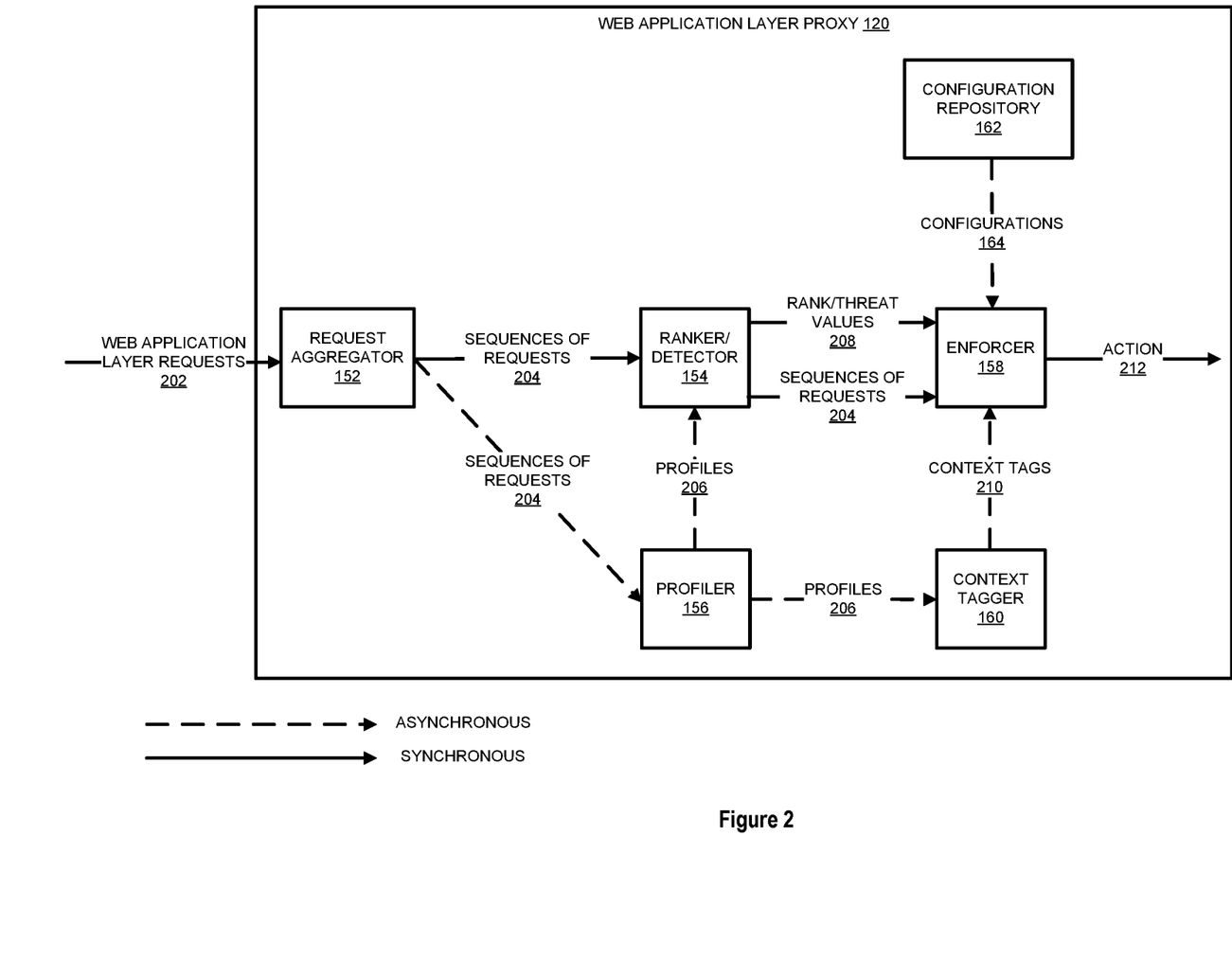
FIG. 2 shows a configuration of components of a web application layer proxy for detecting and mitigating attacks, according to one example embodiment.
Figure 3:
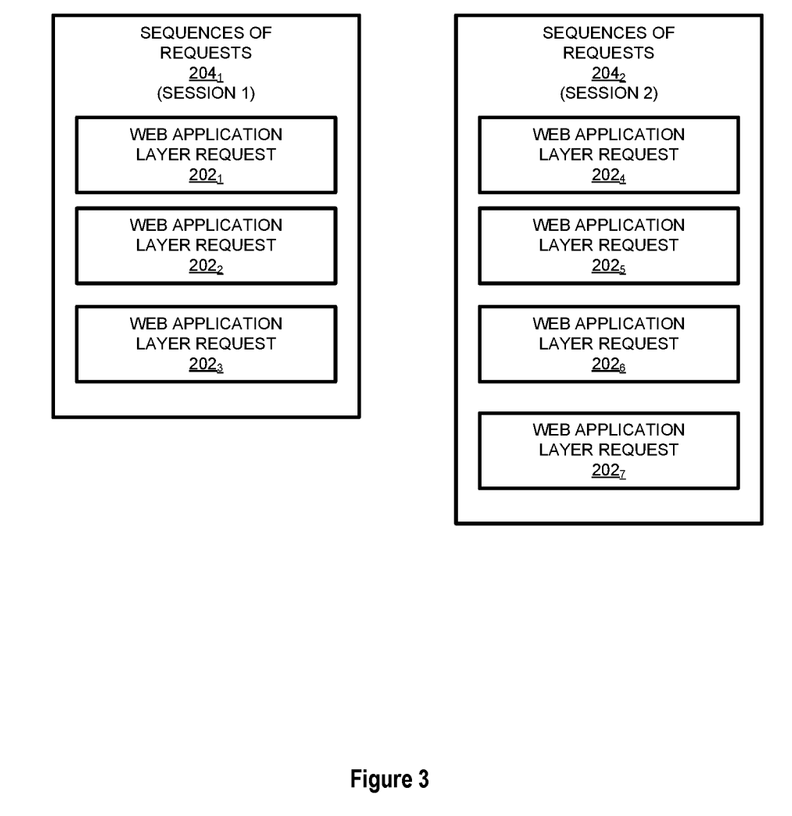
FIG. 3 shows two sequences of requests that correspond to different sessions, according to one example embodiment.

As shown in FIG. 2, the request aggregator 152 receives a group of web application layer requests 202 (sometimes referred herein as requests 202). The web application layer requests 202 may be received from one or more of the web application clients 110. In response to receipt of web application layer requests 202, the request aggregator 152 may aggregate the web application layer requests 202 into corresponding sequences of requests 204. In particular, the request aggregator 152 may aggregate the web application layer requests 202 into sequences of requests 204 based on sessions associated with each web application layer request 202. For instance, FIG. 3 shows two sequences of requests 204: (1) a first sequences of requests 204$_1$, which corresponds to a first session (Session 1) and (2) a second sequences of requests 204$_2$, which corresponds to a second session (Session 2). In this example, the request aggregator 152 may receive web application layer requests 202$_1$-202$_3$, which are associated with the first session, and web application layer requests 202$_4$-202$_7$, which are associated with the second session. Further, in this example, the web application layer requests 202$_1$-202$_3$ may be associated with the first sequence of requests 204$_1$, as these web application layer requests 202$_1$-202$_3$ are associated with the first session, and the web application layer requests 202$_4$-202$_7$ may be associated with the second sequence of requests 204$_2$, as these web application layer requests 202$_4$-202$_7$ are associated with the second session. Accordingly, all web application layer requests 202 can be aggregated/arranged into sequences of requests 204 based on their association with a session.

As used herein, a session may be defined as a temporary information exchange between two parties (e.g., between a web application client 110 or a user/client of a web application client 110 and a web application server 130). In some embodiments, a session can be identified based on one or more of (1) an application session identifier (e.g., a cookie associated with a web application layer request 202), (2) a user identifier (e.g., credentials/tokens associated with a client of a web application client 110 of a web application layer request 202), and (3) other characteristics of web application layer requests 202, such as an origin address of the web application layer request 202 (e.g., an Internet Protocol (IP) address of a web application layer request 202), device identifier associated with the web application layer request 202 (e.g., an identifier of a web application client 110), a port associated with a web application layer request 202, and/or a Transport Layer Security (TLS) signature of a web application layer request 202.

Accordingly, as noted above, the request aggregator 152 aggregates web application layer requests 202 into sequences of requests 204. These sequences of requests 204 can then be transferred/passed to the ranker/detector 154 and the profiler 156. As shown in FIG. 2, the transfer of sequences of requests 204 to the ranker/detector 154 can be performed synchronously, while the transfer of sequences of requests 204 to the profiler 156 can be performed asynchronously. In particular, the operations of the ranker/detector 154 are performed in sequence or along with the operations of the request aggregator 152, while the operations of the ranker/detector 154 are performed independent (from a timing perspective) or in the background relative to the operations of the request aggregator 152 and the ranker/detector 154.

Turning to the profiler 156, this component of the web application layer proxy 120 generates a set of profiles 206 based on the sequences of requests 204 received from the request aggregator 152. In particular, the set of profiles 206 indicates a baseline or expected behavior to expect from clients, web application clients 110, and/or flows based on past behavior (e.g., a baseline is determined based on past sequences of requests 204). For example, a profile 206 may indicate one or more of (1) a number of addresses (e.g., IP addresses) associated with a client (e.g., an average number of addresses associated with a session of client), (2) how many different browsers were involved in a session of client, (3) a set of flows (i.e., groups of requests 202), and (4) how long did the session last.

In some embodiments, the profiler 156 may establish flows as a normalized or filtered sequence of web application layer requests 202 in a session. For example, a session may include a sequence of requests 204 with the pattern A, B, C, C, C, C, and D. In this sequence of requests 204, the web application layer requests 202 identified by "A" and "B" may correspond to a user logging into a chat program, the web application layer requests 202 identified by "C" may correspond to a user sending messages using the chat program (i.e., the user sent several messages as indicated by several web application layer requests 202 identified by "C"), and the web application layer requests 202 identified by "D" may correspond to a user logging out of the chat program. In this example, the profiler 156 may normalize or filter the web application layer requests 202 to remove repetition such that a flow includes the web application layer requests 202 identified by the pattern A, B, C, and D. Accordingly, the general behavior of the interaction is captured with a minimized set of data.

As noted above, the profiles 206 reflect past behavior and are a reflection of future behavior. Namely, the profiles 206 indicate previous behavior and can be used by the web application layer proxy 120 for determining anomalous behavior (i.e., deviations from past behavior), which might indicate a threat/attack against the web application servers 130. The profiler 156 may update profiles 206 dynamically as new sequences of requests 202 are received from the web application clients 110 via the request aggregator 152. The profiler 156 can transfer/pass profiles 206 to both the ranker/detector 154 and the context tagger 160 for further processing and use. As shown in FIG. 2, both the transfer of profiles 206 to the ranker/detector 154 and the context tagger 160 can be performed from the profiler 156 asynchronously in relation to processing new web application layer requests 202. For example, the profiler 156 can provide new profiles 206 or updates to profiles 156 as they are generated or on a predefined basis but independently of the operation of the other components of the web application layer proxy 120.

As described above, the ranker/detector 154 receives both sequences of requests 204, which are organized based on sessions, and profiles 206, which describe a baseline of past behavior and are representative of future behavior. Based on the current actions of clients, as described in sequences of requests 204, and baselines of past behaviors, as indicated by the profiles 206, the ranker/detector 154 determines a potential risk associated with each sequence of requests 204 that are representative of an attack from a web application client 110. In particular, the ranker/detector 154 assigns a ranking and/or a value 208 (sometimes referred to as a rank value 208 or a threat value 208) associated with the potential risk for an attack that they present to the web application servers 130 based on past behavior. The threat value 208 may be determined by the ranker/detector 154 based on a function that takes a set of values, including the sequences of requests 204 and the profiles 206, as inputs. For example, the function may produce a value that describes a distance between characteristics in a current sequence of requests 204 and characteristics described in one or more profiles 206. In this example embodiment, the larger the distance value (i.e., the greater the difference between the sequence of requests 204 and one or more profiles 206) the higher likelihood that the sequence of requests 204 present an attack to the web application servers 130 and consequently the larger the threat value 208. Conversely, the smaller the distance value (i.e., the smaller the difference between the sequence of requests 204 and one or more profiles 206) the lower likelihood that the sequence of requests 204 present an attack to the web application servers 130 and consequently the smaller the threat value 208.

Although described as using a comparison with the profiles 206 to determine the threat values 208, in some embodiments, a technique may be employed that is independent of the profiles 206. For example, the ranker/detector 154 may determine the threat values 208 based on characteristics of the sequences of requests 204. For instance, the ranker/detector 154 may determine the threat values 208 for a sequences of requests 204 based on (1) a number of addresses (e.g., IP addresses) associated with a client (e.g., an average number of addresses associated with a session of client), (2) how many different browsers were involved in the session of client, and (3) how long did the session last and a comparison with an associated set of thresholds.

The ranker/detector 154 may transfer/pass threat values 208 to the enforcer 158 (synchronously in relation to received web application layer requests 202). As will be described in greater detail below, the enforcer 158 may use the threat values 208 along with one or more other pieces of information (e.g., context information and configuration data) to determine an action to perform in relation to a corresponding sequence of requests 204.

As described above and shown in FIG. 2, the context tagger 160 may receive profiles 206 from the profiler 156. These profiles 206 may include a set of flows from previous sequences of requests 204. The context tagger 160 analyzes these profiles 206, including associated flows, and determines one or more context tags 210 for each flow described in each profile 206. In particular, the context tagger 160 may determine and assign one or more business operations to each flow described by the profiles 206. For instance, in the chat program example above, the context tagger 160 may analyze the flow that includes the web application layer requests 202 identified by the pattern A, B, C, and D and assign context tags 160 to sets of web application layer requests 202 in this flow. For example, the web application layer requests 202 identified by "A" and "B" may be assigned the context tag 210 of "login" to signify that these web application layer requests 202 are associated with a user logging into a chat program. Further, the web application layer requests 202 identified by "C" may be assigned the context tag 210 of "chat" to signify that this web application layer request 202 is associated with a user sending chat messages using the chat program. Lastly, the web application layer request 202 identified by "D" may be assigned the context tag 210 of "logout" to signify that this web application layer request 202 is associated with a user logging out of the chat program. As will be described in greater detail below, the enforcer 158 can determine a proper action to take for a sequence of requests 204 in view of several factors, including the context tag 210 in relation to sequences of requests 204. By understanding the context of a sequence of requests 204, the web application layer proxy 120 can better determine if the sequence of requests 204 is part of a business logic attack and can potentially discover nefarious activities that are part of currently unknown attacks (e.g., zero-day attacks). The context tagger 160 may transfer/pass to the enforcer 158 the context tags 210 determined for and assigned to flows and corresponding profiles 206.

In some embodiments, the context tagger can cluster similar flows (e.g., flows that have similar characteristics, such as similar groups of web application layer requests 202). Accordingly, a single context tag 210 can be generated or assigned to a cluster of similar flows.

As described above, the enforcer 158 may receive threat values 208, sequences of requests 204, and context tags 210 for use and further processing. In addition to these pieces of information, the enforcer 158 may receive or otherwise access a set of configurations 164 from the configuration repository 162. In some embodiments, the security center 190 provides the configurations 164 to the configuration repository 162 such that the enforcer 158 may access these configurations 164. The configurations 164 provide security policies for handling sequences of requests 204. In particular, the configurations 164 provided to the enforcer 158 map actions 212 to combinations of one or more of (1) threat values 208 of the sequences of requests 204, (2) characteristics of sequences of requests 204, and (3) context tags 210 such that the enforcer 158 can select an action 212 for a corresponding sequence of requests 204. The actions 212 can be one or more of (1) limit web application layer requests 202 (e.g., a particular type of web application layer requests 202), including one or more flows of a particular type or that share a set of characteristics, business operations of a particular type or that share a set of characteristics, and/or a set of consumers/clients, to protect web application servers 130 against abuse, (2) blacklist web application layer requests 202 (e.g., a particular type of web application layer requests 202), including one or more flows of a particular type or that share a set of characteristics, business operations of a particular type or that share a set of characteristics, and/or a set of consumers/clients, to protect web application servers 130 against known attacks by blocking such attacks, (3) whitelist web application layer requests 202 (e.g., a particular type of web application layer requests 202), including one or more flows of a particular type or that share a set of characteristics, business operations of a particular type or that share a set of characteristics, and/or a set of consumers/clients, to protect against unknown attacks (such as zero-day attacks and business logic attacks) by allowing only known behavior, and (4) challenge web application layer requests 202 from clients/consumers to validate the authenticity of the clients/consumers (e.g., two-factor authentication).

As described above, the web application layer proxy 120 monitors web application layer requests 202 to determine a context associated with each request 202. Based on this context information, the web application layer proxy 120 can detect in real-time unknown attacks (i.e., zero-day attacks) and detect business logic attacks. Further, this monitoring and detection of attacks can be configured separately for each client and requires minimal human labor to configure as the web application layer proxy 120 employs on an ongoing learning process.

Figure 4:
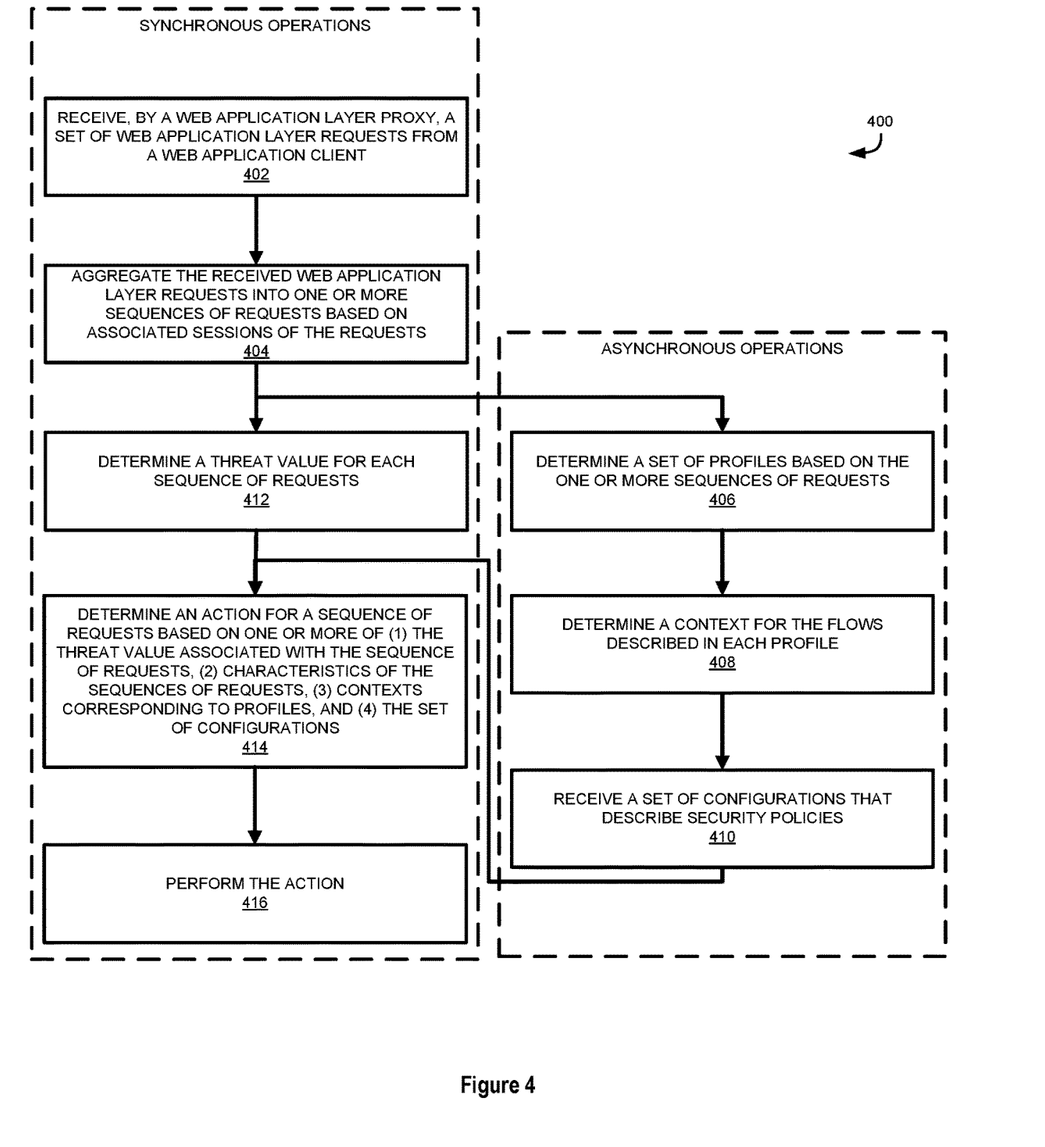
FIG. 4 is a flow diagram of a process for detecting and mitigating attacks from web application clients based on context, according to one example embodiment.

Turning now to FIG. 4, a method 400 will be described for detecting and mitigating attacks from web application clients 110 based on the context of web application layer requests 202, according to one example embodiment. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. Although shown in a particular sequence or order, unless otherwise specified, the order of the operations of the method 400 can be modified. Thus, the illustrated embodiments should be understood only as examples, and the illustrated operations of the method 400 can be performed in a different order, and some operations can be performed in parallel or at least partially overlapping time periods. Additionally, one or more operations of the method 400 can be omitted in various embodiments. Thus, not all operations are required in every embodiment.

As shown in FIG. 4, the method 400 may commence at operation 402 with the web application layer proxy 120 receiving a group/plurality of web application layer requests 202. The web application layer requests 202 may be received from one or more of the web application clients 110 and may be directed to a web application server 130.

As shown in FIG. 4, the method 400 may be divided into (1) a set of synchronous operations, including the operations 402, 404, 412, 414, and 416, and (2) a set of asynchronous operations, including the operations 406, 408, and 410. The set of synchronous operations are performed synchronous with the receipt of the web application layer requests 202 at operation 402. In contrast, the set of asynchronous operations are performed asynchronous with the receipt of the web application layer requests 202 (i.e., a set of background operations relative to the receipt and processing of the group/plurality of web application layer requests 202 at operation 402).

Continuing with the set of synchronous operations, at operation 404, in response to receipt of web application layer requests 202, the request aggregator 152 of the web application layer proxy 120 may aggregate the received web application layer requests 202 into corresponding sequences of requests 204. In particular, the request aggregator 152 may aggregate the web application layer requests 202 into sequences of requests 204 based on sessions associated with each web application layer request 202.

Turning to the set of asynchronous operations, at operation 406 the profiler 156 of the web application layer proxy 120 generates a set of profiles 206 based on the sequences of requests 204. In particular, the set of profiles 206 indicates a baseline or expected behavior to expect from clients, web application clients 110, and/or flows based on past behavior (e.g., a baseline is determined based on past sequences of requests 204). For example, a profile 206 may indicate one or more of (1) a number of addresses (e.g., IP addresses) associated with a client (e.g., an average number of addresses associated with a session of client), (2) how many different browsers were involved in a session of client, (3) a set of flows (i.e., groups of requests 202), and (4) how long did the session last.

At operation 408, the context tagger 160 analyzes profiles 206 and determines a context tag 210 for the flows described in each profile 206. In particular, the context tagger 160 may determine and assign a business operation to each profile 206 and/or corresponding flow. For example, as described above, a particular profile 206 may be associated with (1) a first set of web application layer requests 202 that correspond to a flow for the selection and purchase of a set of tickets to a sporting event via a website (i.e., a first context tag 210) and (2) a second set of web application layer requests 202 that correspond to a flow for searching for a product on a website (i.e., a second context tag 210). In another example, addition, a particular profile 206 may be associated with (1) a first set of web application layer requests 202 that correspond to a purchase of a product from an application (e.g., an app) (i.e., a first context tag 210) and (2) a second set of web application layer requests 202 that correspond to a purchase of the product from a web browser (i.e., a second context tag 210). Accordingly, the profiler 156 determines context tags 210 (e.g., business operations) associated with each flow for a profile 206 such that a proper action 212 can be determined for a sequence of requests 204 in view of several factors, including the context tag 210 of the sequence of requests 204 (i.e., flow). By understanding the context of a sequence of requests 204, the web application layer proxy 120 can better determine if the sequence of requests 204 is part of a business logic attack and can potentially discover nefarious activities that are part of currently unknown attacks (e.g., zero-day attacks).

At operation 410, the enforcer 158 receives a set of configurations 164. For example, in some embodiments, the security center 190 provides the configurations 164 to the configuration repository 162 such that the enforcer 158 may access these configurations 164 at operation 410. The configurations 164 provide security policies for handling sequences of requests 204. In particular, the configurations 164 provided to the enforcer 158 map actions 212 to combinations of one or more of (1) threat values 208 of the sequences of requests 204, (2) characteristics of sequences of requests 204, and (3) context tags 210 such that the enforcer 158 can select an action 212 for a corresponding sequence of requests 204.

Returning to the set of synchronous operations, at operation 412 the ranker/detector 154 determines a potential risk (i.e., threat value 208) associated with each sequence of requests 204 being part of an attack from a web application client 110 based on the current activities of clients, as described in the sequences of requests 204, and baselines of past behaviors, as indicated by the profiles 206. In particular, at operation 412 the ranker/detector 154 assigns a threat value 208 associated with the potential risk for an attack that a sequence of requests 204 presents to the web application servers 130 based on past behavior. The threat value 208 may be based on a function that takes a set of values, including the sequences of requests 204 and the profiles 206, as inputs. For example, as described above, the function may produce a value that describes a distance between a current sequence of requests 204 and one or more profiles 206. In this example embodiment, the larger the distance value (i.e., the greater the difference between the sequence of requests 204 and one or more profiles 206), the higher likelihood that the sequence of requests 204 present an attack to the web application servers 130 and consequently the larger the threat value 208. Conversely, the smaller the distance value (i.e., the smaller the difference between the sequence of requests 204 and one or more profiles 206) the lower likelihood that the sequence of requests 204 present an attack to the web application servers 130 and consequently the smaller the threat value 208.

At operation 414, the enforcer 158 determines an action 212 for a sequence of requests 204 based on one or more of (1) a threat value 208 associated with the sequence of requests 204, (2) characteristics of the sequences of requests 204, (3) context tags 210 corresponding to flows and/or profiles 206, and (4) a set of configurations 164. The actions 212 can be one or more of (1) limit web application layer requests 202 (e.g., a particular type of web application layer requests 202), including one or more flows of a particular type or that share a set of characteristics, business operations of a particular type or that share a set of characteristics, and/or a set of consumers/clients, to protect web application servers 130 against abuse, (2) blacklist web application layer requests 202 (e.g., a particular type of web application layer requests 202), including one or more flows of a particular type or that share a set of characteristics, business operations of a particular type or that share a set of characteristics, and/or a set of consumers/clients, to protect web application servers 130 against known attacks by blocking such attacks, (3) whitelist web application layer requests 202 (e.g., a particular type of web application layer requests 202), including one or more flows of a particular type or that share a set of characteristics, business operations of a particular type or that share a set of characteristics, and/or a set of consumers/clients, to protect against unknown attacks (such as zero-day attacks and business logic attacks) by allowing only known behavior, and (4) challenge web application layer requests 202 from clients/consumers to validate the authenticity of the clients/consumers (e.g., two-factor authentication).

At operation 416, the web application layer proxy 120 can perform the action 212. In some embodiments, the action 212 is performed by the web application layer proxy 120 in conjunction with input or other action by the web application client(s) 110 from which the sequence of requests 204 originated and/or the web application server(s) 130 from which the sequence of requests 204 are addressed.

One or more components of the system may be deployed in a cloud (e.g., a cloud provided by a cloud provider such as Amazon®, Microsoft®, etc.) and/or on premise (e.g., in an enterprise network). In an exemplary arrangement, the web application layer proxy 120 is deployed in the cloud 195 while the web application servers 130 are deployed on-premise, and any web application layer requests originated by the web application clients 110 that are intended for the web application servers 130 are first directed to the web application layer proxy 120 in the cloud 195 (e.g., by changing Domain Name Service (DNS) records) before being sent to the on-premise web application servers 130. It should be understood that other arrangements are also possible. For example, both the web application layer proxy 120 and the web application servers 130 may be deployed in the cloud or both may be deployed on-premise. In one embodiment, the security center 190 is deployed in a cloud (which may be the same or different cloud than the cloud 195 in which the web application layer proxy 120 is deployed).

While various embodiments are described in a context of a web application layer proxy that receives web application layer requests generated by web application clients and destined for web application servers, it should be understood that this is by way of example and not intended to be limiting. It should be understood that the dynamic counter creation mechanisms disclosed herein can be applied in other contexts to dynamically create counters for other types of traffic (e.g., database traffic, file server traffic, etc.).

Figure 5:
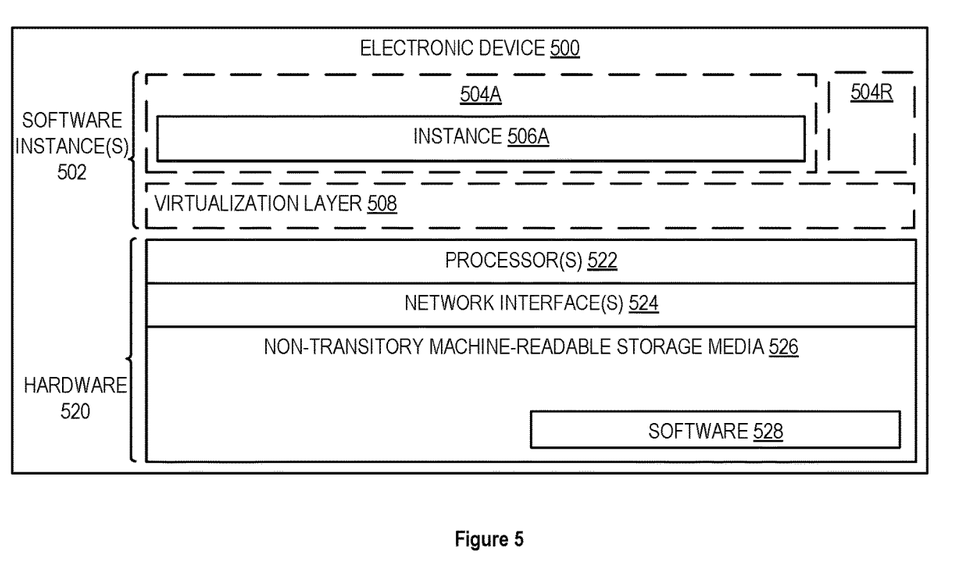
FIG. 5 is a block diagram illustrating an electronic device, according to some embodiments.

FIG. 5 is a block diagram illustrating an electronic device, according to some embodiments. FIG. 5 illustrates hardware 520 comprising a set of one or more processor(s) 522, a set of one or more network interfaces 524 (wireless and/or wired), and non-transitory machine-readable storage medium/media 526 having stored therein software 528 (which includes instructions executable by the set of one or more processor(s) 522). Software 528 can include code, which when executed by hardware 520, causes the electronic device 500 to perform operations of one or more embodiments described herein. Thus, as previously described, the web application layer proxy 120 and/or the web application servers 130 may be implemented in one or more electronic devices.

In electronic devices that use compute virtualization, the set of one or more processor(s) 522 typically execute software to instantiate a virtualization layer 508 and software container(s) 504A-R (e.g., with operating system-level virtualization, the virtualization layer 508 represents the kernel of an operating system (or a shim executing on a base operating system) that allows for the creation of multiple software containers 504A-R (representing separate user space instances and also called virtualization engines, virtual private servers, or jails) that may each be used to execute a set of one or more applications; with full virtualization, the virtualization layer 508 represents a hypervisor (sometimes referred to as a virtual machine monitor (VMM)) or a hypervisor executing on top of a host operating system, and the software containers 504A-R each represent a tightly isolated form of a software container called a virtual machine that is run by the hypervisor and may include a guest operating system; with para-virtualization, an operating system or application running with a virtual machine may be aware of the presence of virtualization for optimization purposes). Again, in electronic devices where compute virtualization is used, during operation an instance of the software 528 (illustrated as instance 506A) is executed within the software container 504A on the virtualization layer 508. In electronic devices where compute virtualization is not used, the instance 506A on top of a host operating system is executed on the "bare metal" electronic device 500. The instantiation of the instance 506A, as well as the virtualization layer 508 and software containers 504A-R if implemented, are collectively referred to as software instance(s) 502.

Alternative implementations of an electronic device may have numerous variations from that described above. For example, customized hardware and/or accelerators might also be used in an electronic device.

The techniques shown in the figures can be implemented using code and data stored and executed on one or more electronic devices (e.g., an end station, a network device). Such electronic devices, which are also referred to as computing devices, store and communicate (internally and/or with other electronic devices over a network) code and data using computer-readable media, such as non-transitory machine-readable storage media (e.g., magnetic disks, optical disks, random access memory (RAM), read-only memory (ROM); flash memory, phase-change memory) and transitory computer-readable communication media (e.g., electrical, optical, acoustical or other form of propagated signals, such as carrier waves, infrared signals, digital signals). In addition, electronic devices include hardware, such as a set of one or more processors coupled to one or more other components, e.g., one or more non-transitory machine-readable storage media to store code and/or data, and a set of one or more wired or wireless network interfaces allowing the electronic device to transmit data to and receive data from other computing devices, typically across one or more networks (e.g., Local Area Networks (LANs), the Internet). The coupling of the set of processors and other components is typically through one or more interconnects within the electronic device, (e.g., busses, bridges). Thus, the non-transitory machine-readable storage media of a given electronic device typically stores code (i.e., instructions) for execution on the set of one or more processors of that electronic device. Of course, various parts of the various embodiments presented herein can be implemented using different combinations of software, firmware, and/or hardware. As used herein, a network device (e.g., a router, switch, bridge) is an electronic device that is a piece of networking equipment, including hardware and software, which communicatively interconnects other equipment on the network (e.g., other network devices, end stations). Some network devices are "multiple services network devices" that provide support for multiple networking functions (e.g., routing, bridging, switching), and/or provide support for multiple application services (e.g., data, voice, and video).

The operations in the flow diagrams have been described with reference to the exemplary embodiments of the other diagrams. However, it should be understood that the operations of the flow diagrams can be performed by embodiments of the invention other than those discussed with reference to these other diagrams, and the embodiments of the invention discussed with reference these other diagrams can perform operations different than those discussed with reference to the flow diagrams.

Similarly, while the flow diagrams in the figures show a particular order of operations performed by certain embodiments, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method by one or more network devices implementing a web application layer proxy for detecting and mitigating attacks from web application clients based on context of web application layer requests, wherein the web application layer proxy is communicatively coupled between one or more web application clients and one or more web application servers, the method comprising:

receiving, by the web application layer proxy, a plurality of web application layer requests from a web application layer client of the one or more web application clients;

aggregating, by the web application layer proxy, a first set of web application layer requests from the plurality of web application layer requests, wherein the first set of web application layer requests are part of a first session;

determining, by the web application layer proxy, a profile based on the first set of web application layer requests, wherein the profile describes a baseline of expected behavior for a user of the web application layer client;

determining, by the web application layer proxy based on the profile, a first context tag and a second context tag for a first flow described in the first set of web application layer requests, wherein the first flow in the first set of web application layer requests is defined by one or more web application layer requests, wherein the first context tag indicates a first business operation performed by the first flow and the second context tag indicates a second business operation performed by the first flow; and determining, by the web application layer proxy, a first threat value associated with the first set of web application layer requests based on the first set of web application layer requests and the profile, wherein the first threat value describes the likelihood that the first set of web application layer requests are part of an attack on the one or more web application servers.

2. The method of claim 1, further comprising:

receiving, by the web application layer proxy, a set of configurations that describe security policies, including a mapping one or more of (1) threat values, (2) characteristics of web application layer requests, and (3) context tags to actions to be taken by the web application layer proxy.

3. The method of claim 2, further comprising:

determining, by the web application layer proxy, a first action in relation to the first set of web application layer requests based on a comparison with the set of configurations and one or more of (1) the first threat value, (2) characteristics of the first set of web application layer requests, and (3) the first and second context tags; and performing, by the web application layer proxy, the first action to mitigate a potential attack by the first set of web application layer requests.

4. The method of claim 3, wherein the first action includes one or more of (1) limiting web application layer requests, (2) blacklisting a first type of web application layer requests, (3) whitelisting a second type of web application layer requests, and (4) challenging one or more web application layer requests from the web application layer client following the plurality of web application layer requests to validate the authenticity of the web application layer client.

5. The method of claim 3, further comprising:

aggregating, by the web application layer proxy, a second set of web application layer requests from the plurality of web application layer requests, wherein the second set of web application layer requests are part of a second session;

determining, by the web application layer proxy, the profile based on the first set of web application layer requests and the second set of web application layer requests; and determining, by the web application layer proxy, a second threat value associated with the second set of web application layer requests based on the second set of web application layer requests and the profile, wherein the second threat value describes the likelihood that the second set of web application layer requests is part of an attack on the one or more web application servers.

6. The method of claim 5, further comprising:

determining, by the web application layer proxy based on the profile, a third context tag for a second flow described in the second set of web application layer requests, wherein the second flow in the second set of web application layer requests is defined by one or more web application layer requests and the third context tag indicates a business operation performed by the second flow;

determining, by the web application layer proxy, a second action in relation to the second set of web application layer requests based on a comparison with the set of configurations and one or more of (1) the second threat value, (2) characteristics of the second set of web application layer requests, and (3) the third context tag; and performing, by the web application layer proxy, the second action to mitigate a potential attack by the second set of web application layer requests.

7. A set of one or more non-transitory machine-readable storage media storing instructions which, when executed by one or more processors of one or more network devices implementing a web application layer proxy that is communicatively coupled between one or more web application clients and one or more web application servers, cause the one or more network devices to perform operations for detecting and mitigating attacks from web application clients based on context of web application layer requests, the operations comprising:

receiving a plurality of web application layer requests from a web application layer client of the one or more web application clients;

aggregating a first set of web application layer requests from the plurality of web application layer requests, wherein the first set of web application layer requests are part of a first session;

determining a profile based on the first set of web application layer requests, wherein the profile describes a baseline of expected behavior for a user of the web application layer client;

determining, by the web application layer proxy based on the profile, a first context tag and a second context tag for a first flow described in the first set of web application layer requests, wherein the first flow in the first set of web application layer requests is defined by one or more web application layer requests, wherein the first context tag indicates a first business operation performed by the first flow and the second context tag indicates a second business operation performed by the first flow; and determining a first threat value associated with the first set of web application layer requests based on the first set of web application layer requests and the profile, wherein the first threat value describes the likelihood that the first set of web application layer requests are part of an attack on the one or more web application servers.

8. The set of one or more non-transitory machine-readable storage media of claim 7, wherein the operations further comprise:

receiving a set of configurations that describe security policies, including a mapping one or more of (1) threat values, (2) characteristics of web application layer requests, and (3) context tags to actions to be taken by the web application layer proxy.

9. The set of one or more non-transitory machine-readable storage media of claim 8, wherein the operations further comprise:
determining a first action in relation to the first set of web application layer requests based on a comparison with the set of configurations and one or more of (1) the first threat value, (2) characteristics of the first set of web application layer requests, and (3) the first and second context tags; and
performing the first action to mitigate a potential attack by the first set of web application layer requests.

10. The set of one or more non-transitory machine-readable storage media of claim 9, wherein the first action includes one or more of (1) limiting web application layer requests, (2) blacklisting a first type of web application layer requests, (3) whitelisting a second type of web application layer requests, and (4) challenging one or more web application layer requests from the web application layer client following the plurality of web application layer requests to validate the authenticity of the web application layer client.

11. The set of one or more non-transitory machine-readable storage media of claim 9, wherein the operations further comprise:
aggregating a second set of web application layer requests from the plurality of web application layer requests, wherein the second set of web application layer requests are part of a second session;
determining the profile based on the first set of web application layer requests and the second set of web application layer requests; and
determining a second threat value associated with the second set of web application layer requests based on the second set of web application layer requests and the profile, wherein the second threat value describes the likelihood that the second set of web application layer requests is part of an attack on the one or more web application servers.

12. The set of one or more non-transitory machine-readable storage media of claim 11, wherein the operations further comprise:
determining, based on the profile, a third context tag for a second flow described in the second set of web application layer requests, wherein the second flow in the second set of web application layer requests is defined by one or more web application layer requests and the third context tag indicates a business operation performed by the second flow;
determining a second action in relation to the second set of web application layer requests based on a comparison with the set of configurations and one or more of (1) the second threat value, (2) characteristics of the second set of web application layer requests, and (3) the third context tag; and
performing the second action to mitigate a potential attack by the second set of web application layer requests.

13. A network device configured to implement a web application layer proxy that is to be communicatively coupled between one or more web application clients and one or more web application servers, wherein the web application layer proxy is configured to dynamically detect and mitigate attacks from the one or more web application clients based on context of web application layer requests, the network device comprising:
one or more processors; and
a non-transitory machine-readable storage medium having instructions stored therein, which when executed by the one or more processors, cause the network device implementing the web application layer proxy to:
receive a plurality of web application layer requests from a web application layer client of the one or more web application clients;
aggregate a first set of web application layer requests from the plurality of web application layer requests, wherein the first set of web application layer requests are part of a first session;
determine a profile based on the first set of web application layer requests, wherein the profile describes a baseline of expected behavior for a user of the web application layer client;
determine, by the web application layer proxy based on the profile, a first context tag and a second context tag for a first flow described in the first set of web application layer requests, wherein the first flow in the first set of web application layer requests is defined by one or more web application layer requests, wherein the first context tag indicates a first business operation performed by the first flow and the second context tag indicates a second business operation performed by the first flow; and
determine a first threat value associated with the first set of web application layer requests based on the first set of web application layer requests and the profile, wherein the first threat value describes the likelihood that the first set of web application layer requests are part of an attack on the one or more web application servers.

14. The network device of claim 13, wherein the instructions, when executed by the one or more processors, further cause the network device implementing the web application layer proxy to:
receive a set of configurations that describe security policies, including a mapping one or more of (1) threat values, (2) characteristics of web application layer requests, and (3) context tags to actions to be taken by the web application layer proxy.

15. The network device of claim 14, wherein the instructions, when executed by the one or more processors, further cause the network device implementing the web application layer proxy to:
determine a first action in relation to the first set of web application layer requests based on a comparison with the set of configurations and one or more of (1) the first threat value, (2) characteristics of the first set of web application layer requests, and (3) the first and second context tags; and
perform the first action to mitigate a potential attack by the first set of web application layer requests.

16. The network device of claim 15, wherein the first action includes one or more of (1) limiting web application layer requests, (2) blacklisting a first type of web application layer requests, (3) whitelisting a second type of web application layer requests, and (4) challenging one or more web application layer requests from the web application layer client following the plurality of web application layer requests to validate the authenticity of the web application layer client.

17. The network device of claim 15, wherein the instructions, when executed by the one or more processors, further cause the network device implementing the web application layer proxy to:

aggregate a second set of web application layer requests from the plurality of web application layer requests, wherein the second set of web application layer requests are part of a second session;

determine the profile based on the first set of web application layer requests and the second set of web application layer requests;

determine a second threat value associated with the second set of web application layer requests based on the second set of web application layer requests and the profile, wherein the second threat value describes the likelihood that the second set of web application layer requests is part of an attack on the one or more web application servers;

determine, based on the profile, a third context tag for a second flow described in the second set of web application layer requests, wherein the second flow in the second set of web application layer requests is defined by one or more web application layer requests and the third context tag indicates a business operation performed by the second flow;

determine a second action in relation to the second set of web application layer requests based on a comparison with the set of configurations and one or more of (1) the second threat value, (2) characteristics of the second set of web application layer requests, and (3) the third context tag; and perform the second action to mitigate a potential attack by the second set of web application layer requests.

* * * * *